United States Patent
Hsieh et al.

(10) Patent No.: US 11,582,003 B2
(45) Date of Patent: Feb. 14, 2023

(54) FEEDER LINK IN DATA TRANSPORT IN WIRELESS TELECOMMUNICATION SYSTEMS

(71) Applicant: Nokia Technologies Oy, Espoo (FI)

(72) Inventors: Tzu-Chung Hsieh, Hoffman Estates, IL (US); Shahzada Basharat Rasool, Ashburn, VA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/214,135

(22) Filed: Mar. 26, 2021

(65) Prior Publication Data

US 2022/0311573 A1  Sep. 29, 2022

(51) Int. Cl.
| H04L 12/66 | (2006.01) |
| H04L 5/00 | (2006.01) |
| H04J 3/12 | (2006.01) |
| H04J 7/00 | (2006.01) |
| H04J 3/08 | (2006.01) |

(52) U.S. Cl.
CPC ............ H04L 5/0048 (2013.01); H04J 3/08 (2013.01); H04J 3/12 (2013.01); H04J 7/00 (2013.01); H04L 5/0007 (2013.01)

(58) Field of Classification Search
CPC .......... H04L 5/0048; H04L 5/007; H04J 3/08; H04J 3/12; H04J 7/00
See application file for complete search history.

(56) References Cited

U.S. PATENT DOCUMENTS

| 5,311,550 A | 5/1994 | Fouche et al. |
| 6,201,798 B1 * | 3/2001 | Campanella ....... H04B 7/18526 370/522 |
| 7,944,993 B2 * | 5/2011 | Dankberg .......... H04B 7/18517 375/267 |
| 10,742,320 B2 | 8/2020 | Dimitrov |
| 2007/0202816 A1 * | 8/2007 | Zheng .................... H04B 1/707 455/91 |
| 2021/0051510 A1 * | 2/2021 | Chae .................... H04B 17/309 |

(Continued)

FOREIGN PATENT DOCUMENTS

| WO | 2017/124004 A1 | 7/2017 |
| WO | 2018/075962 A1 | 4/2018 |

OTHER PUBLICATIONS

"3rd Generation Partnership Project; Technical Specification Group Radio Access Network;Evolved Universal Terrestrial Radio Access (E-UTRA);Physical channels and modulation (Release 16)", 3GPP TS 36.211, V16.4.0, Dec. 2020, pp. 1-249.

(Continued)

*Primary Examiner* — Abdelnabi O Musa
(74) *Attorney, Agent, or Firm* — Squire Patton Boggs (US) LLP

(57) ABSTRACT

Systems, methods, apparatuses, and computer program products for feeder link data transport are provided. For example, baseband in-phase and quadrature (IQ) data may be processed at the transmitter and receiver of the feeder link. The orthogonal frequency division multiplexing (OFDM) waveform used in a beam may be modified for transmission over the feeder link. For example, the waveform may have a wider subcarrier spacing (SCS) and may fill an enlarged bandwidth than otherwise with a feeder link.

20 Claims, 9 Drawing Sheets

(56) References Cited

U.S. PATENT DOCUMENTS

2022/0070811 A1* 3/2022 Tripathi .............. H04W 56/006
2022/0104083 A1* 3/2022 Jeong .............. H04W 36/00835

OTHER PUBLICATIONS

"3rd Generation Partnership Project; Technical Specification Group Radio Access Network; NR;Physical channels and modulation (Release 16)", 3GPP TS 38.211, V16.4.0, Dec. 2020, pp. 1-133.

"3rd Generation Partnership Project; Technical Specification Group Radio Access Network; Evolved Universal Terrestrial Radio Access (E-UTRA);Base Station (BS) radio transmission and reception(Release 17)", 3GPP TS 36.104, V17.0.0, Dec. 2020, pp. 1-290.

"3rd Generation Partnership Project; Technical Specification Group Radio Access Network; NR;Base Station (BS) radio transmission and reception(Release 17)", 3GPP TS 38.104, V17.0.0, Dec. 2020, pp. 1-295.

"HAPS—High-Altitude Platform Systems", ITU, Retrieved on Mar. 9, 2021, Webpage available at: https://www.itu.int/en/mediacentre/backgrounders/Pages/High-altitude-platform-systems.aspx.

"HAPS Mobile", HAPS Mobile, Retrieved on Mar. 9, 2021, Webpage available at : https://www.hapsmobile.com/en/.

"Airbus Zephyr", Airbus, Retrieved on Mar. 9, 2021, Webpage available at : https://www.airbus.com/defence/uav/zephyr.html.

"3rd Generation Partnership Project;Technical Specification Group Radio Access Network; Study on New Radio (NR) to support non-terrestrial networks (Release 15)", 3GPP TR 38.811, V15.4.0, Sep. 2020, pp. 1-127.

"3rd Generation Partnership Project; Technical Specification Group Radio Access Network; Solutions for NR to support non-terrestrial networks (NTN)(Release 16)", 3GPP TR 38.821, V16.0.0, Dec. 2019, pp. 1-140.

"Loon", Loon, Retrieved on Mar. 9, 2021, Webpage available at: https://loon.com/.

International Search Report and Written Opinion dated Jun. 27, 2022 corresponding to International Patent Application No. PCT/EP2022/055240.

* cited by examiner

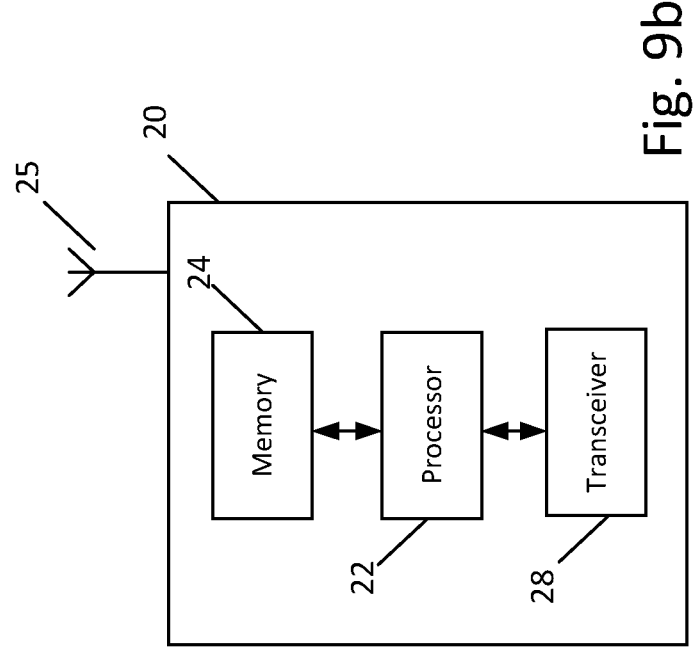
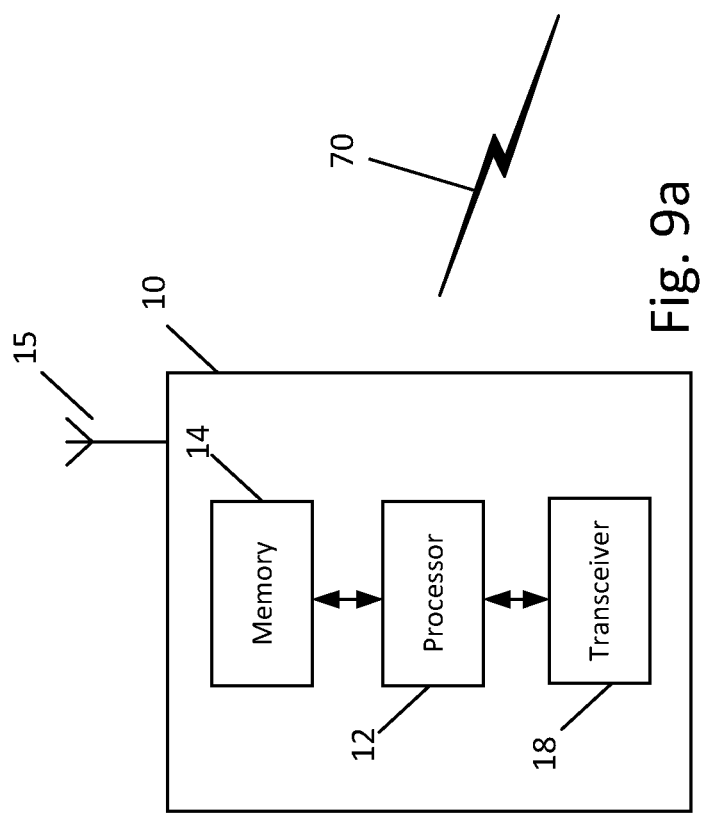

FEEDER LINK IN DATA TRANSPORT IN WIRELESS TELECOMMUNICATION SYSTEMS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for feeder link data transport.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to transmit, on a feeder link, a stream of symbols multiplexed in series. The stream of multiplexed symbols may be ordered and may be formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The at least one memory and the computer program code may be configured to, with the at least one processor, cause the apparatus at least to transmit, between sets of symbols of the stream of multiplexed symbols, one or more reference signals.

In a variant, the apparatus may include at least one of a gateway station, a high altitude platform station, or a satellite. In a variant, a quantity of symbols in the sets of symbols may be equal to a multiple of a quantity of the one or more parallel streams of symbols. In a variant, the at least one memory and the computer program code may be configured to, with the at least one processor, further cause the apparatus at least to multiplex the one or more parallel streams of symbols to form the stream of multiplexed symbols. In a variant, the at least one memory and the computer program code may be configured to, with the at least one processor, further cause the apparatus, when multiplexing the one or more parallel streams of symbols, at least to multiplex the one or more parallel streams of symbols in an order of beam indexes of the one or more beams.

In a variant, the at least one memory and the computer program code may be configured to, with the at least one processor, further cause the apparatus, when transmitting the stream of multiplexed symbols, at least to transmit the stream of multiplexed symbols to another network node. In a variant, the other network node may include at least one of a gateway station, a high altitude platform station, or a satellite. In a variant, the at least one memory and the computer program code may be configured to, with the at least one processor, further cause the apparatus at least to transmit information on a management link. In a variant, the at least one memory and the computer program code may be configured to, with the at least one processor, when transmitting the information, at least to transmit, on the management link, the information. In a variant, the information may include at least one of a quantity of the one or more beams, a sample rate of the stream of multiplexed symbols, a number of samples in a symbol of the stream of multiplexed symbols, a beam index order of the one or more beams, or sample rates of the one or more parallel streams. In a variant, the at least one memory and the computer program code may be configured to, with the at least one processor, when transmitting the information, at least to transmit, on the management link, the information. In a variant, the information may include, for configuring the one or more reference signals, at least one of a type of the one or more reference signals, a timing of the one or more reference signals, or a periodicity of the one or more reference signals.

According to a second embodiment, an apparatus may include at least one processor and at least one memory including computer program code. The at least one memory and the computer program code may be configured to, with the at least one processor, cause the apparatus at least to receive, on a feeder link, a stream of symbols multiplexed in series. The stream of multiplexed symbols may be ordered and formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The at least one memory and the computer program code may be configured to, with the at least one processor, cause the apparatus at least to receive, between sets of symbols of the stream of multiplexed symbols, one or more reference signals.

In a variant, the apparatus may include at least one of a gateway station, a high altitude platform station, or a satellite. In a variant, a quantity of symbols in the sets of symbols may be equal to a multiple of a quantity of the one or more parallel streams of symbols. In a variant, the at least one memory and the computer program code may be configured to, with the at least one processor, further cause the apparatus, when receiving of the stream of symbols, at least to receive the stream of symbols from another network node.

In a variant, the other network node may include at least one of a gateway station, a high altitude platform station, or a satellite.

In a variant, the at least one memory and the computer program code may be configured to, with the at least one processor, further cause the apparatus at least to receive information on a management link. In a variant, the at least one memory and the computer program code may be configured to, with the at least one processor, when receiving the information, at least to receive the information on the management link. In a variant, the information may include at least one of a quantity of the one or more beams, a sample rate of the stream of multiplexed symbols, a number of samples in a symbol of the stream of multiplexed symbols, a beam index order of the one or more beams, or sample rates of the one or more parallel streams. In a variant, the at least one memory and the computer program code may be configured to, with the at least one processor, when receiving the information, at least to receive, on the management link, the information. In a variant, the information may include, for configuring the one or more reference signals, at least one of a type of the one or more reference signals, a timing of the one or more reference signals, or a periodicity of the one or more reference signals.

In a variant, the at least one memory and the computer program code may be configured to, with the at least one processor, further cause the apparatus at least to determine a sample or symbol timing of the stream of multiplexed symbols based on the one or more reference signals, and correct frequency or phase errors associated with the stream of multiplexed symbols based on the one or more reference signals. In a variant, the at least one memory and the computer program code may be configured to, with the at least one processor, further cause the apparatus at least to demultiplex the stream of multiplexed symbols into the one or more parallel streams of symbols in an order of beam indexes of the one or more beams. In a variant, the at least one memory and the computer program code may be configured to, with the at least one processor, further cause the apparatus at least to process the time-domain samples for the one or more parallel streams of symbols at the sample rates of the one or more parallel streams of symbols.

According to a third embodiment, a method may include transmitting, by an apparatus on a feeder link, a stream of symbols multiplexed in series. The stream of multiplexed symbols may be ordered and may be formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The method may include transmitting, between sets of symbols of the stream of multiplexed symbols, one or more reference signals.

In a variant, the apparatus may include at least one of a gateway station, a high altitude platform station, or a satellite. In a variant, a quantity of symbols in the sets of symbols may be equal to a multiple of a quantity of the one or more parallel streams of symbols. In a variant, the method may include multiplexing the one or more parallel streams of symbols to form the stream of multiplexed symbols. In a variant, multiplexing the one or more parallel streams of symbols may include multiplexing the one or more parallel streams of symbols in an order of beam indexes of the one or more beams.

In a variant, the transmitting the stream of multiplexed symbols may include transmitting the stream of multiplexed symbols to another network node. In a variant, the other network node may include at least one of a gateway station, a high altitude platform station, or a satellite. In a variant, the method may include transmitting information on a management link. In a variant, the transmitting the information may include transmitting, on the management link, the information. In a variant, the information may include at least one of a quantity of the one or more beams, a sample rate of the stream of multiplexed symbols, a number of samples in a symbol of the stream of multiplexed symbols, a beam index order of the one or more beams, or sample rates of the one or more parallel streams. In a variant, the transmitting the information may include transmitting, on the management link, the information. In a variant, the information may include, for configuring the one or more reference signals, at least one of a type of the one or more reference signals, a timing of the one or more reference signals, or a periodicity of the one or more reference signals.

According to a fourth embodiment, a method may include receiving, by an apparatus on a feeder link, a stream of symbols multiplexed in series. The stream of multiplexed symbols may be ordered and formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The method may include receiving, between sets of symbols of the stream of multiplexed symbols, one or more reference signals.

In a variant, the apparatus may include at least one of a gateway station, a high altitude platform station, or a satellite. In a variant, a quantity of symbols in the sets of symbols may be equal to a multiple of a quantity of the one or more parallel streams of symbols. In a variant, the receiving of the stream of symbols may include receiving the stream of symbols from another network node. In a variant, the other network node may include at least one of a gateway station, a high altitude platform station, or a satellite.

In a variant, the method may include receiving information on a management link. In a variant, the receiving the information may include receiving the information on the management link. In a variant, the information may include at least one of a quantity of the one or more beams, a sample rate of the stream of multiplexed symbols, a number of samples in a symbol of the stream of multiplexed symbols, a beam index order of the one or more beams, or sample rates of the one or more parallel streams. In a variant, the receiving the information may include receiving, on the management link, the information. In a variant, the information may include, for configuring the one or more reference signals, at least one of a type of the one or more reference signals, a timing of the one or more reference signals, or a periodicity of the one or more reference signals.

In a variant, the method may include determining a sample or symbol timing of the stream of multiplexed symbols based on the one or more reference signals, and correcting frequency or phase errors associated with the stream of multiplexed symbols based on the one or more reference signals. In a variant, the method may include demultiplexing the stream of multiplexed symbols into the one or more parallel streams of symbols in an order of beam indexes of the one or more beams. In a variant, the method may include processing the time-domain samples for the one or more parallel streams of symbols at the sample rates of the one or more parallel streams of symbols.

A fifth embodiment may be directed to an apparatus that may include circuitry configured to cause the apparatus to perform the method according to the third embodiment or the fourth embodiment, or any of the variants discussed above for the third and fourth embodiments.

A sixth embodiment may be directed to an apparatus that may include means for performing the method according to the third embodiment or the fourth embodiment, or any of the variants discussed above for the third and fourth embodiments. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants discussed above for the third and fourth embodiments.

An eighth embodiment may be directed to a computer program product encoding instructions for causing an apparatus to perform at least the method according to the third embodiment or the fourth embodiment, or any of the variants discussed above for the third and fourth embodiments.

BRIEF DESCRIPTION OF THE DRAWINGS

For proper understanding of example embodiments, reference should be made to the accompanying drawings, wherein:

FIG. 9a illustrates an example block diagram of an apparatus, according to an embodiment; and FIG. 9b illustrates an example block diagram of an apparatus, according to another embodiment.

DETAILED DESCRIPTION

Figure 1:
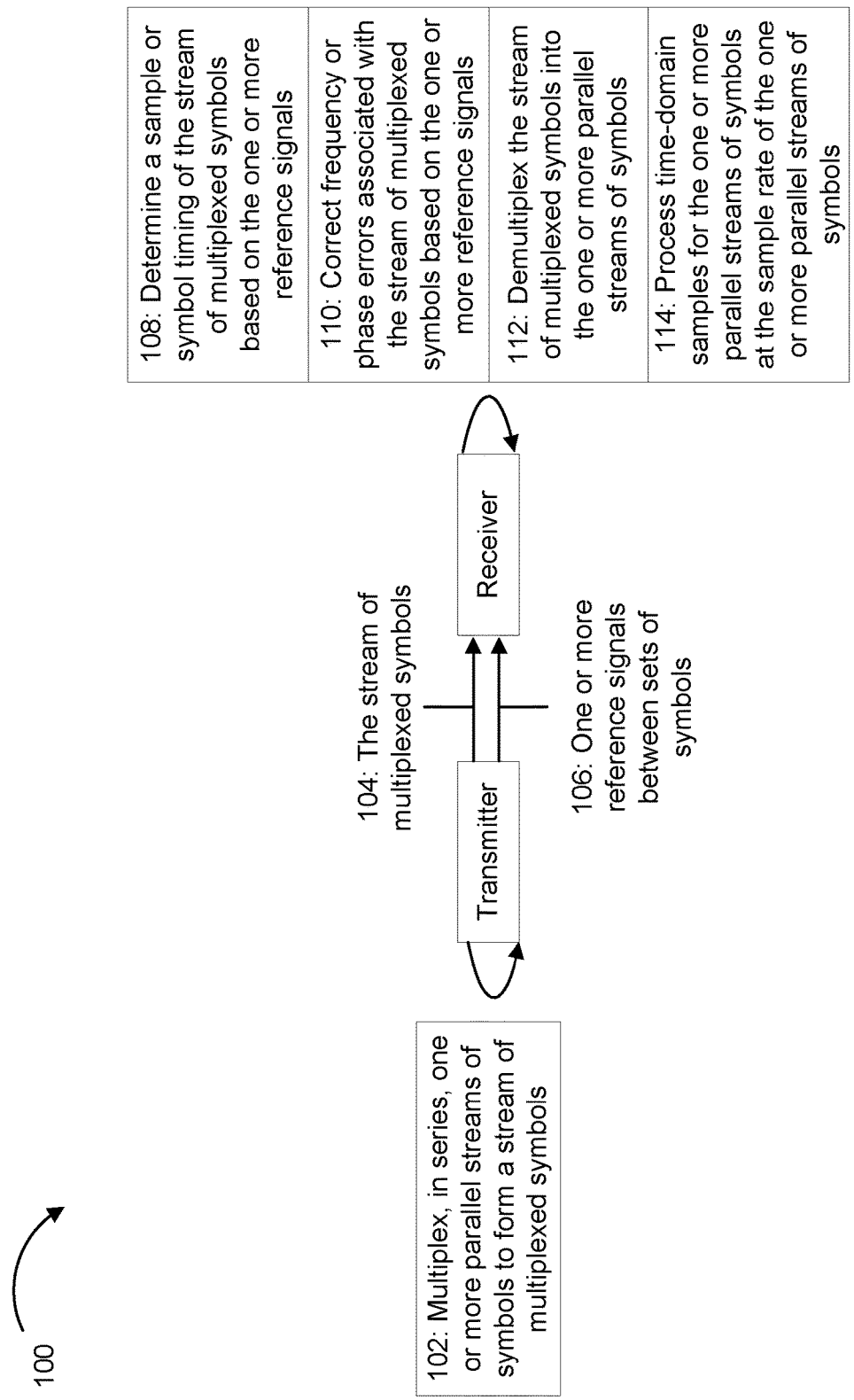
FIG. 1 illustrates an example of feeder link data transport, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for feeder link data transport is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

A high altitude platform station (HAPS) may include a communication node deployed in the atmosphere (e.g., in the stratosphere at an altitude of 18-24 kilometers (km)), and therefore a HAPS can provide a large coverage area on the ground (e.g., approximately 100 km coverage radius). The aerial platform for HAPS can include a balloon, an unmanned aircraft, and/or the like. Certain technologies, such as aeronautics, solar energy, and battery efficiency may enable a HAPS to stay deployed and continuously operate for a long time, such as several months. Using HAPS or satellites to provide data service to a user equipment (UE) may be included in NR. A non-terrestrial network (NTN) including a HAPS or a satellite can connect remote areas currently not reachable by terrestrial networks and may serve maritime and airline transportation industries, for example. HAPS or satellites may also provide communication for public safety and/or disaster relief.

An example deployment scenario for NTN may include a service link between the HAPS or satellite and a UE, and a feeder link between the HAPS or satellite and a gateway. The service link may use a cellular air interface (e.g., 4G long-term evolution (LTE) or 5G NR air interface) to deliver data service to the UE. The feeder link between the HAPS or satellite and the ground gateway station may transport aggregated user data to or from the core network. NTN may be implemented in either regenerative or transparent architecture.

In the regenerative architecture, base station functionality may be partially or fully implemented in a HAPS or satellite and physical layer (PHY) and/or medium access control (MAC) processing, such as packet encoding, decoding, and/or scheduling may be performed on-board the HAPS or satellite. In the transparent architecture, however, the full base station (e.g., the eNB or gNB) may be co-located with the gateway station (e.g., implemented at or behind the gateway station), and the HAPS or satellite may act as a repeater between the UE and the ground station. In that case, the HAPS or satellite may perform frequency conversion and/or power amplification between the service link and/or the feeder link.

Lower frequency bands (e.g., less than 2.7 gigahertz (GHz)) may be better suited for a wide area coverage due to their lower propagation losses when compared with higher frequencies in millimeter wave (mmWave) range. For example, a signal's propagation loss generally increases with the square of the carrier frequency, such that the larger the loss, the weaker the desired signal is at the coverage edge. A lower frequency enables a signal to reach farther with possibly an acceptable signal-to-noise ratio and, therefore, a larger coverage area. For mobile data services, HAPS or satellites may be expected to use LTE bands or NR frequency range 1 (FR1), e.g., sub-6 GHz spectrum to connect with a UE. In addition, HAPS mobile data services may be expected to use frequency bands below 2.7 GHz for the service link. For example, HAPS may be allocated spectrum in mmWave range of 21, 24, 31, or 47 GHz for fixed services and may be allocated frequency bands in 700 megahertz (MHz), 2 GHz and 2.6 GHz ranges for mobile data services. Multiple beams may be generated by the antenna array on a HAPS or satellite to cover a large service area with the desired antenna gain that enables a high user throughput. In some scenarios, the area of one beam on the ground can have a diameter in the range of 20-100 km for HAPS and can be even larger for a low-Earth orbit (LEO) satellite. With this size of beam coverage, the lowest 15 kilohertz (kHz) subcarrier spacing (SCS) may be the preferred option in the NR OFDM numerology since the corresponding longest cyclic prefix (CP) may allow for a maximum timing error tolerance.

The feeder link may have a wide bandwidth to transport the aggregated data from multiple beams to the gateway station. In the case of N active beams, each operating over a channel bandwidth $B_C$, the feeder link may have to have a bandwidth that satisfies the following relationship: $B_{FL}>NB_C$, where $B_{FL}$ may represent the feeder link bandwidth. Since it may be difficult to find large bandwidth in congested lower bands, the feeder link may be likely to use the higher frequency spectrum other than the bands for mobile data services. For example, to support 7 beam HAPS deployment with a frequency division duplex (FDD) carrier of 20 MHz, there may have to be at least 140 MHz feeder link in downlink (DL) and uplink (UL) or 280 MHz if the feeder link uses unpaired spectrum. This wide bandwidth may be difficult to find in NR FR1 (<6 GHz) where 15 kHz SCS can be used. Some carriers may have ~20 MHz FDD bandwidth (20 MHz DL and 20 UL for a total of 40 MHZ FDD spectrum) in each of the bands below 2.6 GHz and may have up to 100 MHz time division duplex (TDD) (unpaired spectrum) for 2.6-4.5 GHz bands.

For regenerative HAPS or satellites, PHY and/or MAC processing of the service link may be implemented on-board and the feeder link may be independently designed. As such, frequency band selection for the feeder link may be flexible. However, for transparent HAPS or satellites, the base station may be located on the ground, so the feeder link may have to carry the same LTE and/or NR waveform used by the UE. To support the same numerology in the service link for wide-area coverage (e.g., 15 kHz SCS), the feeder link may have to use LTE bands or NR FR1 bands. However, those bands may not have sufficient bandwidth to support multiple beams for a large coverage area.

An alternative may include converting the lower frequency LTE and/or NR waveform (e.g., 15 kHz SCS) to a higher frequency in the feeder link, so that the frequency carrier from each beam occupies a sub-band in the higher frequency spectrum. This approach, however, may be problematic since the radio frequency (RF) signal at a high frequency (e.g., in mmWave bands) may be susceptible to phase noise or Doppler effect-induced distortions. The LTE and/or NR waveform of a small SCS that is modulated on a high frequency carrier can be severely corrupted. For example, in NR, FR1 may be allowed to use SCS of 15, 30, or 60 KHz, whereas FR2 may be allowed to use SCS of 60, 120, or 240 KHz. Phase noise and Doppler induced distortion of a signal may be one of the reasons why the higher frequency FR2 has to use a larger SCS. In addition, amplifier phase noise may have to increase with carrier frequency and, therefore, a larger SCS may be needed. If the feeder link uses 48 GHz band, for example, directly converting the 15 KHz SCS waveform of the service link to a 48 GHz carrier for the feeder link may encounter signal distortion problems.

As can be understood from the above, various problems may be present. For example, <2.7 GHz frequency bands may be used for a service link for a large coverage area, it may be difficult to find a sufficient bandwidth for feeder link in FR1 (<6 GHz), and when higher frequency spectrum (e.g., 48 GHz where a large bandwidth is available) is used for the feeder link the SCS of the service link (e.g., 15 KHz) may lead to signal distortion in the feeder link. Thus, there may be a need for providing a feeder link with a high frequency band (e.g., >6 GHz) such that the feeder link supports multiple lower frequency carriers (e.g., <6 GHz, such as <2.7 GHz) in the service link for LTE or NR data service by HAPS or satellites. For example, the high frequency band for the feeder link may be >6 GHz since NR may support one set of orthogonal frequency division multiplexing (OFDM) numerology (e.g., 15 KHz SCS) in FR1, which is <6 GHz, and it may be difficult to find sufficient bandwidth in FR1 for the feeder link.

Some embodiments described herein may provide for feeder link data transport. For example, certain embodiments may provide for processing of baseband in-phase and quadrature (IQ) data at the transmitter and receiver of the feeder link. Certain embodiments may modify the OFDM waveform used in a beam for transmission over the feeder link. For example, the waveform may have a wider SCS and fill a wider bandwidth than otherwise with a feeder link. With the increased SCS, the signal may be robust against the channel distortion and phase noise in the high frequency spectrum (e.g., >6 GHz), thereby improving communications on a feeder link.

At the feeder link transmitter (e.g., at a gateway station for user downlink (DL) traffic or at a HAPS or satellite for user uplink (UL) traffic), there may be M streams of baseband OFDM time-domain samples of rate R, where each stream of samples may be associated with one beam. The M parallel streams may be multiplexed by OFDM symbols (where one OFDM symbol may include $N_S$ contiguous samples) into a single stream of interleaved OFDM symbols that is subsequently transmitted at rate NR on the feeder link carrier. Thus, certain embodiments may expand the bandwidth of the OFDM waveform by N times, where the parameter N may be a positive real number and satisfies the following condition: N>M. In the remaining 1−(M/N) fraction of transmission time, reference signals (e.g., a sequence with certain auto-correlation properties) can be periodically inserted after kM OFDM symbols, where k may be a value according to: $k \in \{1, 2, \ldots\}$. These reference signals can be used for time and/or frequency synchronization of the feeder link.

At the feeder link receiver (e.g., at a HAPS or satellite for user DL traffic or at a gateway station for user UL traffic), the received baseband OFDM time-domain samples of rate NR may be demultiplexed by OFDM symbols into M parallel streams according to the symbol timing indicated by the reference signal. Each of the M streams may be associated with a beam and may be processed at sample rate R. After these operations, the original OFDM waveform may be restored at the receiver. In this way, certain embodiments may improve communications between a transmitter and a receiver on a feeder link. This may conserve network resources (e.g., bandwidth) and/or processing resources that would otherwise be consumed as a result of interference due to, e.g., channel distortion or phase noise. Additionally, or alternatively, this may reduce data loss that might otherwise occur as a result of the interference.

FIG. 1 illustrates an example 100 of feeder link data transport, according to some embodiments. As illustrated in FIG. 1, the example 100 includes a transmitter and a receiver connected via a feeder link. For DL traffic, the transmitter may include a gateway station and the receiver may include a HAPS, a satellite, and/or the like. For UL traffic, the transmitter may include a HAPS, a satellite, or the like, and the receiver may include a gateway station.

Figure 2:
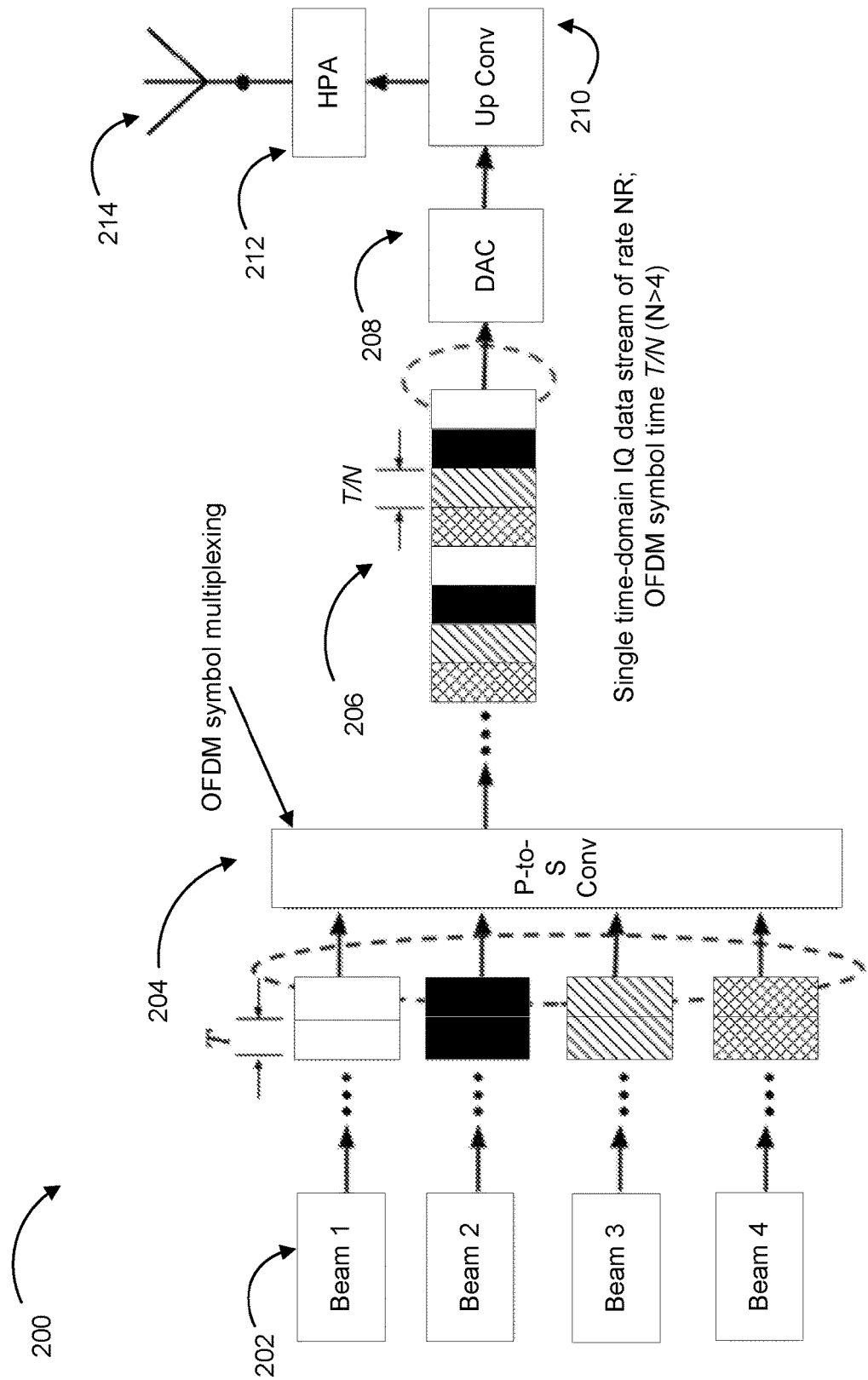
FIG. 2 illustrates an example of multiplexing orthogonal frequency-division multiplexing (OFDM) symbols at a feeder link transmitter, according to some embodiments.

As illustrated at 102, the transmitter may multiplex, in series, one or more parallel streams of symbols to form a stream of multiplexed symbols. For example, M parallel streams of OFDM symbols may be multiplexed on a symbol-by-symbol basis (where one OFDM symbol may include $N_s$ contiguous samples) into a single stream of multiplexed OFDM symbols. The OFDM symbols may be multiplexed in an order such that the transmitter and receiver have information regarding which symbol corresponds to which beam, and the order remains fixed. For example, the OFDM symbols may be multiplexed in an order of beam index, where, in the multiplexed symbol stream, symbol 1 may be from beam 1, symbol 2 may be from beam 2, etc. as illustrated in FIG. 2. The one or more parallel streams of symbols may be represented by time-domain samples corresponding to one or more beams. A sample rate of the stream of multiplexed symbols may be greater than a sum of sample rates of the one or more parallel streams of symbols, and a duration of symbols of the stream of multiplexed symbols may be shorter than a duration of the one or more one or more parallel streams of symbols.

As illustrated at 104, the transmitter may transmit, to the receiver, the stream of multiplexed symbols. In addition, as illustrated at 106, the transmitter may transmit, to the receiver, one or more reference signals (e.g., synchronization reference signals (RS)) between sets of symbols of the stream of multiplexed symbols. For example, the transmitter may determine sets of symbols in the stream of multiplexed symbols, and may transmit RS(s) after transmitting each set. A quantity of symbols in each of the sets of symbols may be equal to a multiple of a quantity of the one or more parallel streams of symbols (e.g., equal to kM).

Figure 5:
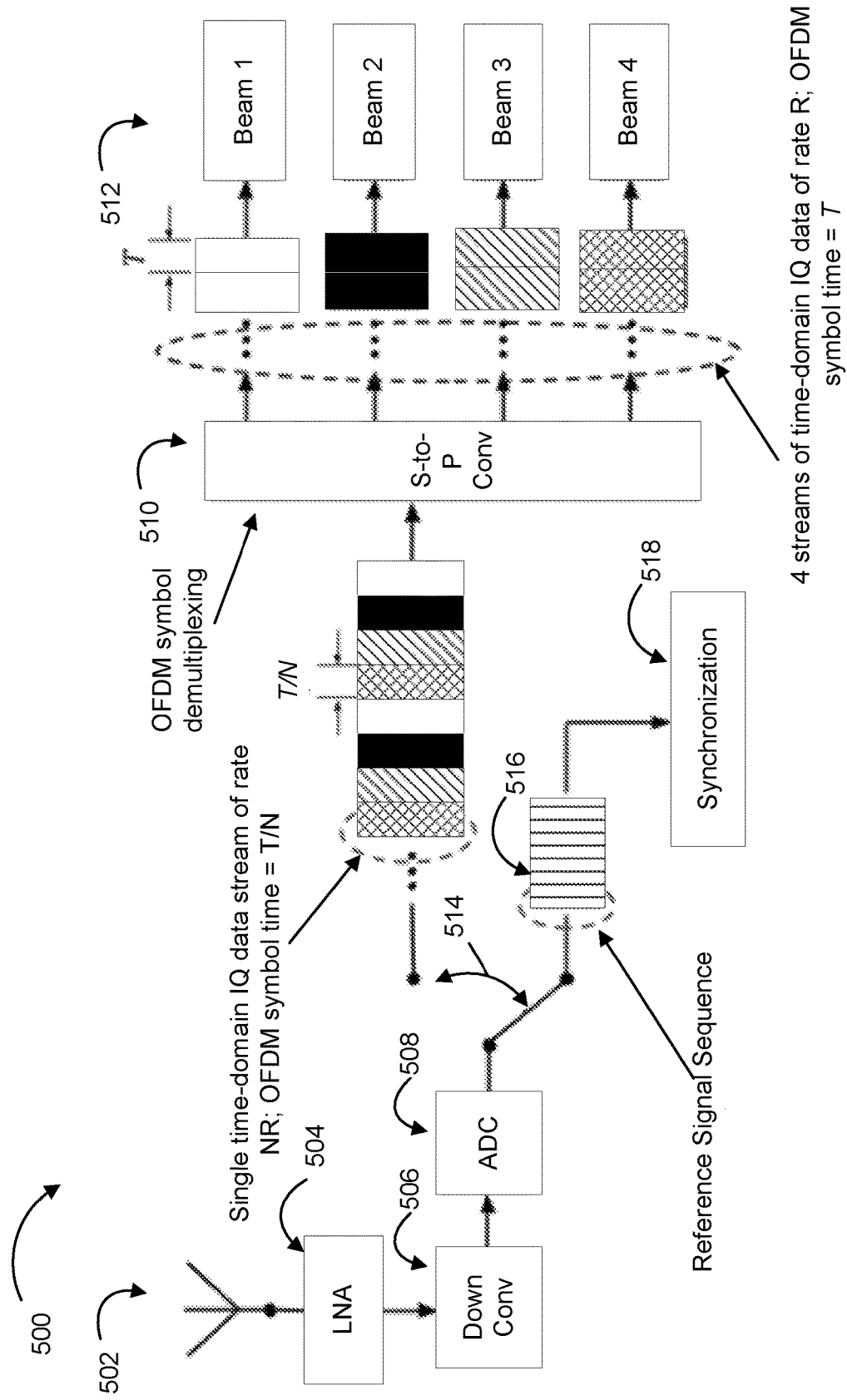
FIG. 5 illustrates an example of demultiplexing OFDM symbols at a feeder link receiver, according to some embodiments.

As illustrated at 108, after receiving the stream of multiplexed symbols and/or the one or more RSs, the receiver may determine a sample or symbol timing of the stream of multiplexed symbols based on the one or more reference signals. As illustrated at 110, the receiver may correct frequency or phase errors associated with the stream of multiplexed symbols based on the one or more reference signals. For example, the receiver may correct frequency or phase errors due to Doppler effect and phase noise. As illustrated at 112, the receiver may demultiplex the stream of multiplexed symbols into the one or more parallel streams of symbols. For example, the receiver may demultiplex the stream of multiplexed symbols into the same parallel streams of symbols processed by the transmitter. The demultiplexing of the OFDM symbols may be performed in the order received from the management link. For example, if the OFDM symbols were multiplexed in the order of beam index, then the demultiplexing may be performed in the beam index order, where symbol 1 is assigned to beam 1, symbol 2 is assigned to beam 2, etc., as shown in FIG. 5. As illustrated at 114, the receiver may process time-domain samples for the one or more parallel streams of symbols at the sample rate of the one or more parallel streams of symbols. For example, the receiver may process the demultiplexed samples at a sample rate, and the original OFDM waveform before feeder link transmission may be restored at this point.

In addition to a feeder link, the transmitter and receiver may be connected via a management link. For example, the transmitter and the receiver may communicate via the management link to configure reference signals on the feeder link (e.g., sequence and occupied resources of the reference signals, or other information related to the type, timing, or periodicity of the reference signals to be transmitted on the feeder link). Additionally, or alternatively, the transmitter and the receiver may communicate, via the management link, a number of beams multiplexed, a sample rate of the multiplexed symbols, a number of samples in one symbol, a beam index order, a sample rate of each of the parallel streams, and/or the like.

As described above, FIG. 1 is provided as an example. Other examples are possible, according to some embodiments.

FIG. 2 illustrates an example 200 of multiplexing OFDM symbols at a feeder link transmitter, according to some embodiments. For example, FIG. 2 illustrates elements and operations of a transmitter.

For a transmitter at gateway station, the payload traffic may be DL data from, e.g., an eNB or a gNB to be delivered by each of the M beams from HAPS/satellite. The M beams in the example 200 are illustrated at 202 as beams 1 through beam 4. The baseband signal for each beam may include the output of an inverse fast Fourier transform (IFFT) operation for the OFDM modulation. For a transmitter on a HAPS or satellite, the payload traffic may include received UL data from the same set of beams. The baseband signal for each beam, after down conversion, may include digitized IQ samples of the service link OFDM waveform. For example, if $T_s$ represents the sample time, the sample rate (R) may be represented by $R=1/T_s$. T and $\Delta f$ may represent, respectively, the OFDM symbol time and the subcarrier spacing (SCS). Based on this, one OFDM symbol may include a number of contiguous samples ($N_s$), determined by: $N_s=T/T_s$. The n-th sample ($0 \leq n < N_s$) may be represented by equation (1):

$$x(n) = \sum_{k=0}^{N_{FFT}-1} a_k e^{j2\pi k \Delta f n T_s} \quad (1)$$

where $N_{FFT}$ may represent the fast Fourier transform (FFT) size and $\alpha_k$ may represent the modulated data symbol on the k-th subcarrier.

Figure 3:
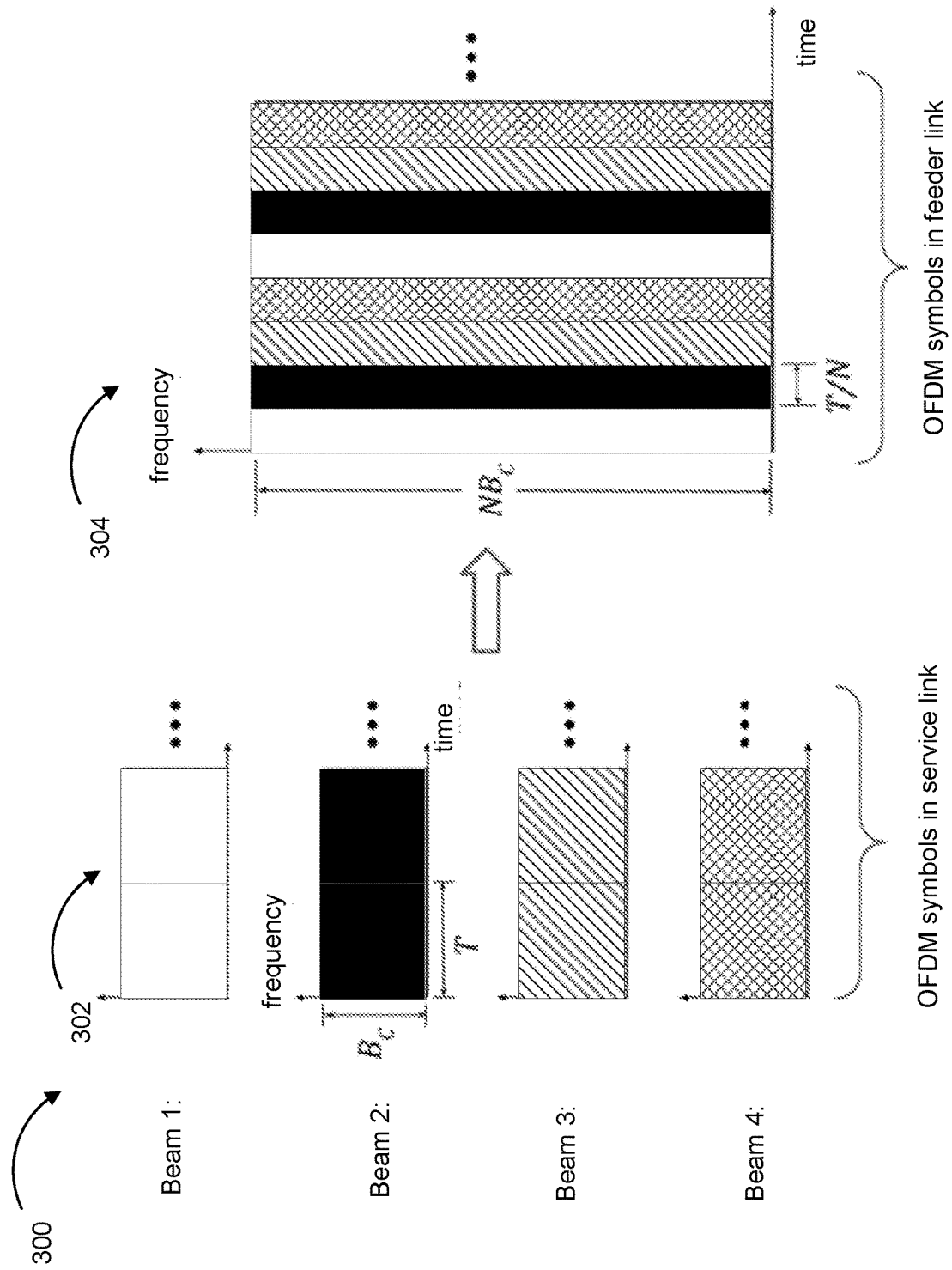
FIG. 3 illustrates an example of frequency and time occupancy of OFDM symbols in a service link and in a feeder link, according to some embodiments.

The M streams of time domain samples corresponding to the M beams may be processed by a parallel-to-serial converter (P-to-S Conv), at 204, to be multiplexed in a symbol-by-symbol manner into a single stream of samples illustrated at 206. This operation may be performed with the $N_s$ samples of one OFDM symbol as an undivided unit. The output stream of multiplexed symbols may include interleaved OFDM symbols in the order of beam index. For example, a symbol from beam 1 (index=1) may be multiplexed into the stream, then a symbols from beam 2 (index=2) may be multiplexed into the stream, and so forth until the symbols for each of the beams are multiplexed into the stream of multiplexed symbols. The $N_s$ samples within an OFDM symbol may be unchanged during this processing. The multiplexed samples may be band-pass modulated on the feeder link carrier at a sample rate N times the service link rate, where N may be a real positive number and the relationship between N and M may be represented by: N>M. In other words, the new sample rate may be represented by (R'), which may be determined as: R'=NR. The determined sample time may be represented by T'$_s$, which may be determined as: T'$_s$=T$_s$/N. The samples of OFDM symbols may be unchanged, and the $N_s$ samples of one symbol may be modulated over a duration equal to: T/N. The sample function in equation (1) above in the determined sample time may be represented by equation (2):

$$x(n) = \sum_{k=0}^{N_{FFT}-1} a_k e^{j2\pi k \Delta f' n T'_s} \quad (2)$$

where Δf'=N Δf and may represent the SCS of the waveform over the feeder link. The waveform may expand SCS N times, may occupy N times larger bandwidth than each of the individual beams, and may reduce the OFDM symbol time by an amount of time equal to: 1/N, as illustrated in the example of FIG. 3 discussed below. The extended SCS may result in a signal that is more resistant to phase noise and channel distortion at high frequency.

Figure 4:
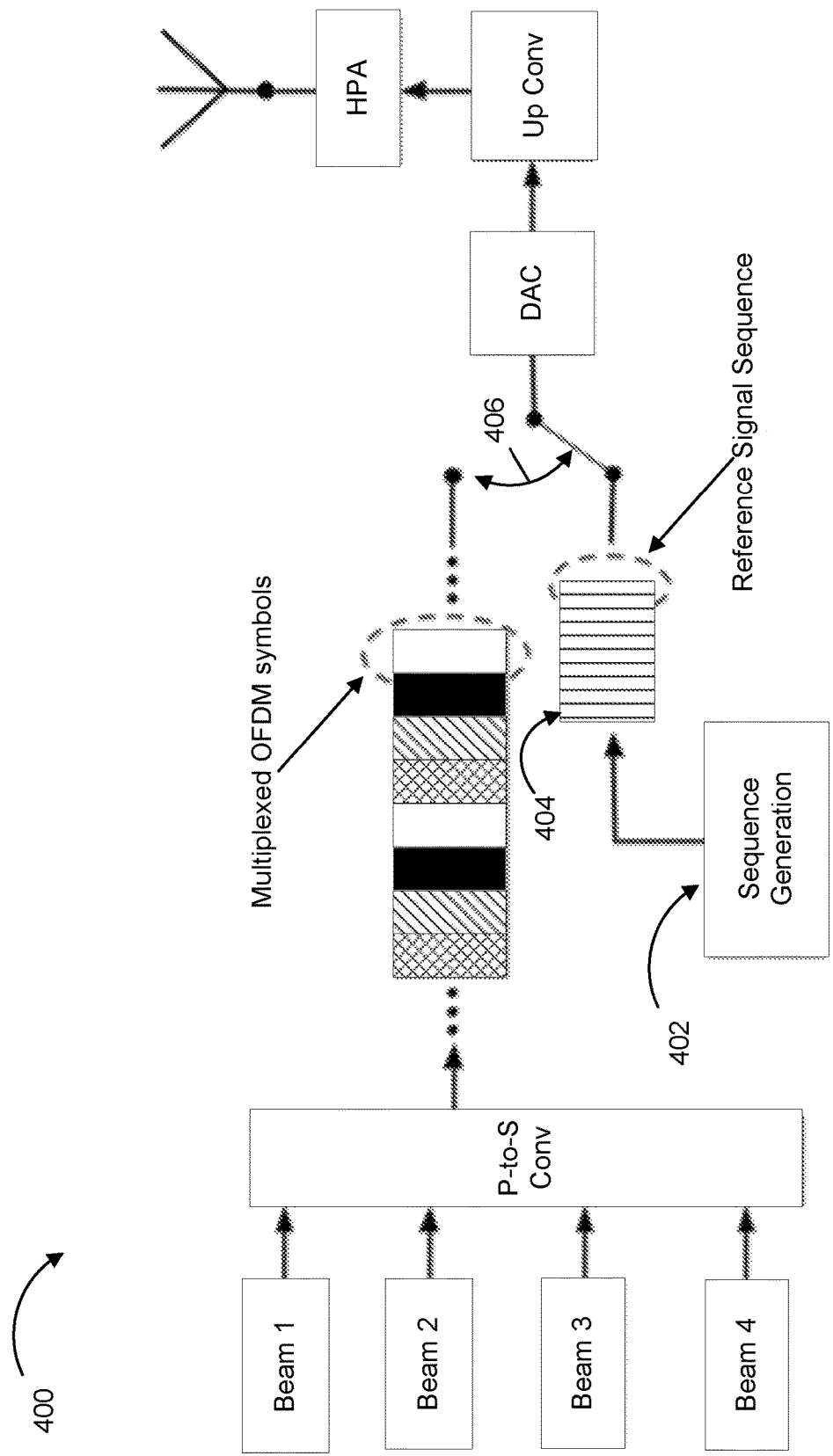
FIG. 4 illustrates an example of insertion of a reference signal, according to some embodiments.

Reference signals for time synchronization may be provided over the feeder link in order for the receiver to determine where in the sample stream are the divisions of OFDM symbols and to correct the frequency and phase errors. With the feeder link sample rate R' greater than the sum of M beams' input sample rate R, there may be a fraction of remaining time 1−(M/N) available for synchronization. A sequence of reference samples with certain auto-correlation properties, e.g., a Zadoff-Chu sequence, can be inserted between two groups OFDM symbols, where the group size can be determined as a multiple of M, e.g., M, 2M, 3M, etc., depending on the length of the sequence and the delay tolerance. Based on this, demultiplexing of OFDM symbols into M beams can be performed within a group at the receiver after time synchronization is acquired. FIG. 4 below illustrates the insertion of reference signals for feeder link transmission.

As illustrated at 208, the stream of multiplexed symbols may be processed at the transmitter by a digital-to-analog converter (DAC). As illustrated at 210, the transmitter may process the analog signal via an up converter, and the transmitter may further process the analog stream of multiplexed symbols using a high power amplifier (HPA), as illustrated at 212. The transmitter may then transmit the stream of multiplexed symbols via an antenna, as illustrated at 214.

As indicated above, FIG. 2 is provided as an example. Other examples are possible, according to some embodiments.

FIG. 3 illustrates an example 300 of frequency and time occupancy of OFDM symbols in a service link and in a feeder link, according to some embodiments. As illustrated at 302, the transmitter may process various parallel streams of symbols for corresponding beams (shown as beams 1 through 4) received at the transmitter in the service link. As illustrated at 304, the processing may result in a stream of multiplexed symbols to be transmitted to the receiver via the feeder link. As explained elsewhere herein, the waveform of the stream of multiplexed symbols may expand SCS N times, occupying N times larger bandwidth, and reducing the OFDM symbol time by 1/N.

As described above, FIG. 3 is provided as an example. Other examples are possible, according to some embodiments.

FIG. 4 illustrates an example 400 of insertion of a reference signal, according to some embodiments. As illustrated in FIG. 4, the example 400 may illustrate operations of the transmitter similar to that illustrated in FIG. 2. In addition, and as illustrated at 402, the transmitter may perform sequence generation to generate a reference signal sequence (e.g., one or more reference signals) illustrated at 404. As illustrated at 406, the transmitter may switch between transmitting the stream of multiplexed symbols and transmitting the reference signal sequence. In this way, the transmitter may insert, and transmit, reference signals between sets of symbols of the stream of multiplexed symbols.

As described above, FIG. 4 is provided as an example. Other examples are possible, according to some embodiments.

FIG. 5 illustrates an example 500 of demultiplexing OFDM symbols at a feeder link receiver, according to some embodiments. For example, the example 500 may illustrate elements and operations of a receiver.

As illustrated at 502, the receiver may receive the analog stream of multiplexed symbols via an antenna. As illustrated at 504, the analog stream of multiplexed symbols may be processed by a low noise amplifier (LNA), and the receiver may further process the analog stream of multiplexed symbols using a down converter (Down Conv) illustrated at 506. The receiver may, as illustrated at 508, process the stream of multiplexed symbols using an analog-to-digital converter (ADC).

At the feeder link receiver, which may be at a HAPS or satellite (for DL user data) or at gateway station (for UL user data), the OFDM sample and symbol timing may be determined from the reference signals. Frequency and phase errors due to Doppler effect and phase noise can also be corrected using the reference signals. The baseband IQ samples of rate R' may be processed by a serial-to-parallel converter (S-to-P Conv), at 510, to demultiplex the stream of OFDM symbols in a symbol-by-symbol manner (e.g., in units of $N_s$ contiguous samples) into M streams in the same order for the M beams, which are illustrated at 512. The sample timing with respect to OFDM symbols (e.g., the samples that correspond to an OFDM symbol) may be used in this process. The demultiplexed samples for each beam may be processed at a sample rate R, and the original OFDM waveform before feeder link transmission, represented by equation (1), may be restored at 512. These per-beam IQ samples may be used by other elements in the receiver or transmitter chain of the service link connected to the receiver. For example, the receiver can transmit the per-beam IQ samples to an eNB and/or gNB baseband unit (BBU) for demodulation or to be up-converted for transmission depending on whether the feeder link receiver is at the gateway station or at a HAPS or satellite.

As illustrated at 514, the receiver may switch between processing the stream of multiplexed symbols and a reference signal sequence illustrated at 516. When processing the reference signal sequence, the receiver may perform synchronization, as illustrated at 518.

As described above, FIG. 5 is provided as an example. Other examples are possible, according to some embodiments.

Figure 6:
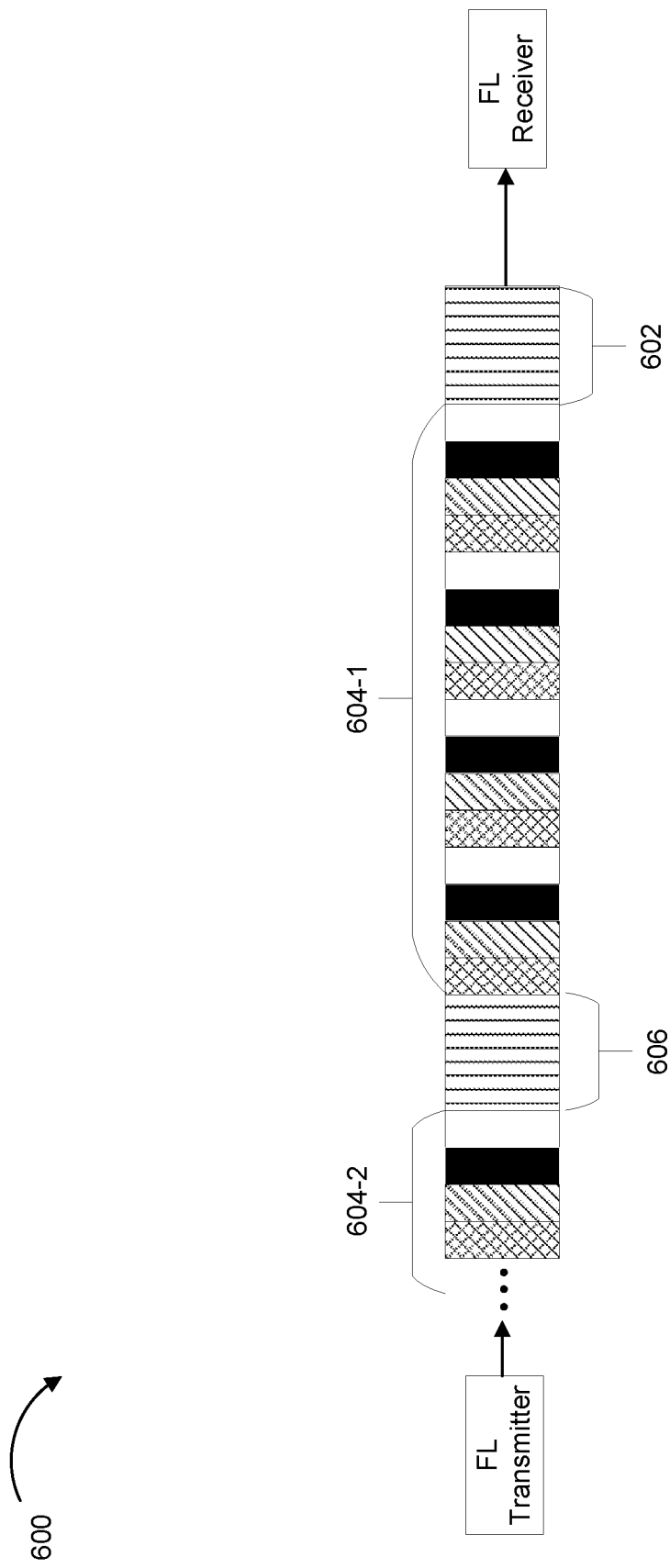
FIG. 6 illustrates an example of transmitting and receiving a preamble reference signal on a feeder link, according to some embodiments.

FIG. 6 illustrates an example 600 of transmitting and receiving a preamble reference signal on a feeder link, according to some embodiments. As illustrated in FIG. 6, the example 600 includes a feeder link (FL) transmitter and a FL receiver. As illustrated, the FL transmitter may transmit, and the FL receiver may receive, a preamble reference signal 602 prior to a stream of symbols (comprising sets of symbols 604-1, 604-2, etc.). In the example 600, each set of symbols 604 may include kM symbols, where, e.g., k=4 and M=4. In some embodiments, the preamble reference signal 602 may facilitate channel synchronization and the FL receiver may process the preamble reference signal 602 to acquire the timing of the stream of symbols and/or to correct frequency errors in the stream of symbols. As further illustrated in FIG. 6, the FL transmitter may transmit, and the FL receiver may receive, reference signals 606 between the sets of symbols 604.

As described above, FIG. 6 is provided as an example. Other examples are possible, according to some embodiments.

Certain embodiments may use a management link, in addition to the feeder link, between the transmitter and the receiver. Because precise digital domain processing may have to be performed at the receiver end, reference signals for time and/or frequency alignment (including for compensation of phase noise) may have to be exchanged between the transmitter and the receiver. These reference signals can be determined by the transmitter and the receiver of the feeder link, without use of a service link or UE, and can be communicated through a management link. The management link may also communicate the number of beams in the service link, M, that are to be multiplexed on the feeder link. Insertion of reference signals, as shown in FIGS. 4 and 5, and their periodicity to maintain link quality, can be managed through the management link between the HAPS and the ground station. The management link may be used to communicate other information, as described elsewhere herein.

Figure 7:
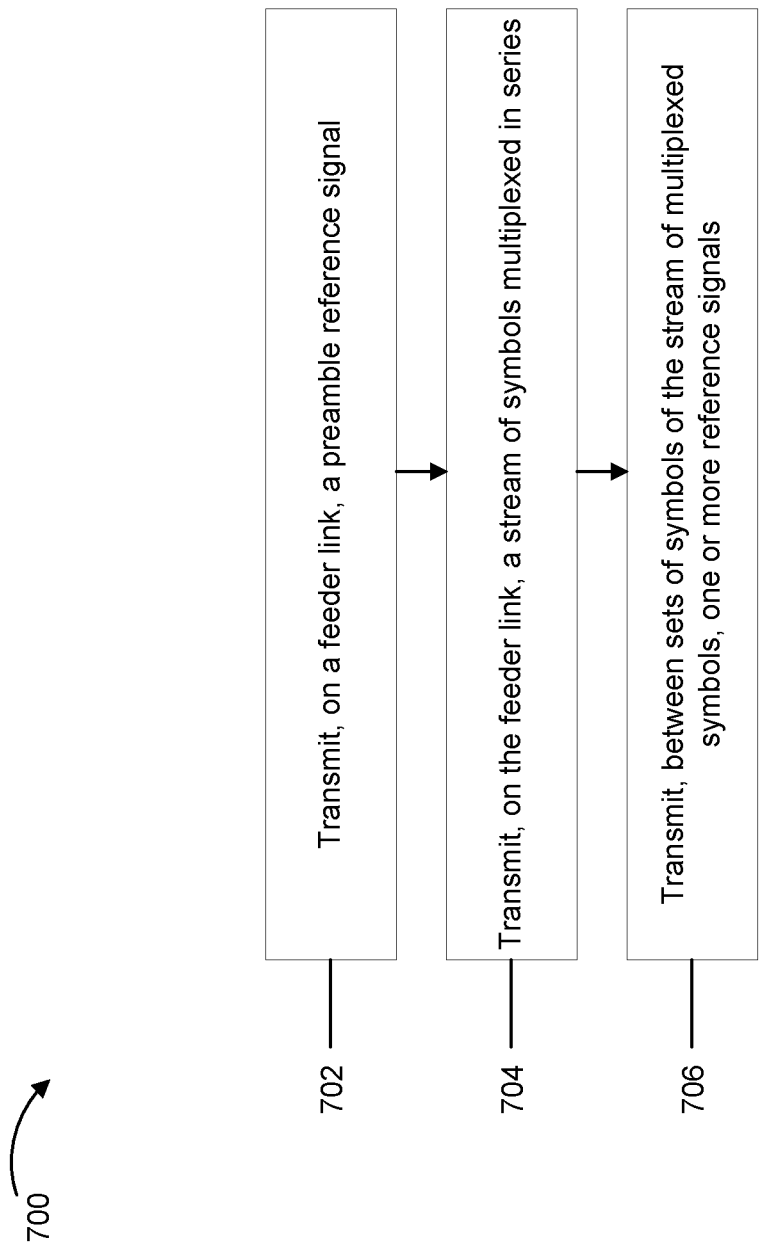
FIG. 7 illustrates an example flow diagram of a method for a transmitter, according to some embodiments.

FIG. 7 illustrates an example flow diagram of a method 700, according to some embodiments. For example, FIG. 7 may illustrate example operations of a network node (e.g., apparatus 10 illustrated in, and described with respect to, FIG. 9a). In particular, FIG. 7 may illustrate example operations of a transmitter described elsewhere herein. Some of the operations illustrated in FIG. 7 may be similar to some operations shown in, and described with respect to, FIGS. 1-5.

In an embodiment, the method 700 may include, at 702, transmitting on a feeder link, a preamble reference signal, e.g., so that a receiver can acquire a timing of samples and channel frequency for a stream of symbols. For example, the preamble reference signal may be transmitted in a manner similar to the preamble reference signal 602 of FIG. 6. The method 700 may include, at 704, transmitting, on the feeder link, a stream of symbols multiplexed in series, e.g., in a manner similar to that at 104 of FIG. 1. The stream of multiplexed symbols may be ordered (e.g., according to beam index) and may be formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The method 700 may include, at 706, transmitting, between sets of symbols of the stream of multiplexed symbols, one or more reference signals, e.g., in a manner similar to that 106 of FIG. 1.

The method illustrated in FIG. 7 may include one or more additional aspects described below or elsewhere herein. In some embodiments, the apparatus may include at least one of a gateway station, a high altitude platform station, or a satellite. In some embodiments, the transmitting at 706 may include transmitting the one or more reference signals between two sets of multiplexed symbols where a quantity of symbols in the sets of symbols may be equal to a multiple of a quantity of the one or more parallel streams of symbols. In some embodiments, the method 700 may further include multiplexing the one or more parallel streams of symbols to form the stream of multiplexed symbols, e.g., in a manner similar to that at 102 of FIG. 1. In some embodiments, the multiplexing may include multiplexing the one or more parallel streams of symbols in an order of beam indexes of the one or more beams.

In some embodiments, the transmitting at 704 may include transmitting to a network node that comprises at least one of a gateway station, a high altitude platform station, or a satellite. In some embodiments, the method 700 may further include transmitting information on a management link. In some embodiments, the transmitting of the information may further include transmitting, on the management link, information that includes at least one of a quantity of the one or more beams, a sample rate of the stream of multiplexed symbols, a number of samples in a symbol of the stream of multiplexed symbols, a beam index order of the one or more beams, or sample rates of the one or more parallel streams. In some embodiments, the transmitting of the information may include transmitting, on the management link, information that includes, for configuring the one or more reference signals, at least one of a type of the one or more reference signals, a timing of the one or more reference signals, or a periodicity of the one or more reference signals.

As described above, FIG. 7 is provided as an example. Other examples are possible according to some embodiments.

Figure 8:
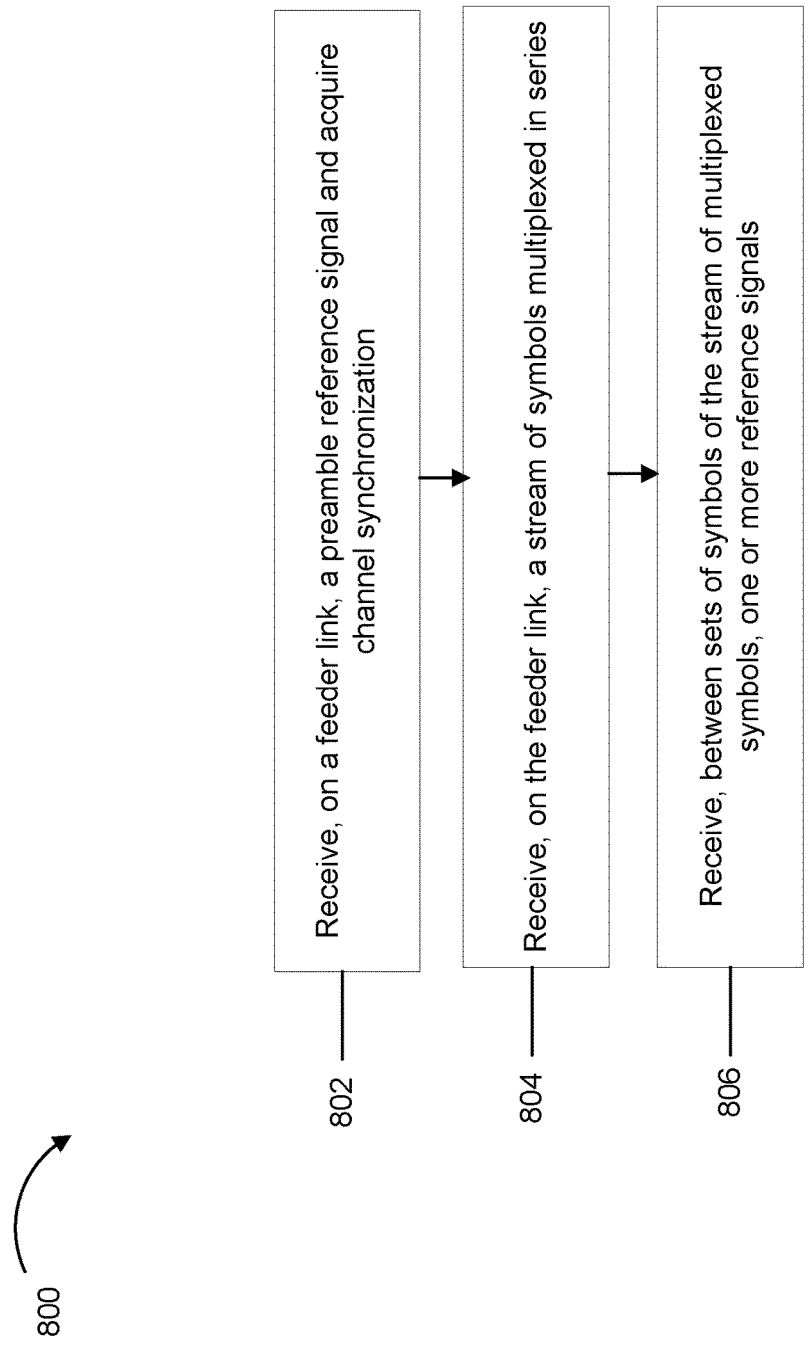
FIG. 8 illustrates an example flow diagram of a method for a receiver, according to some embodiments.

FIG. 8 illustrates an example flow diagram of a method 800, according to some embodiments. For example, FIG. 8 may illustrate example operations of a network node (e.g., apparatus 10 illustrated in, and described with respect to, FIG. 9a). In particular, FIG. 8 may illustrate example operations of a receiver described elsewhere herein. In some embodiments, the network node may include at least one of a gateway station, a high altitude platform station, or a satellite. Some of the operations illustrated in FIG. 8 may be similar to some operations shown in, and described with respect to, FIGS. 1-5. The method illustrated in FIG. 8 may include one or more additional aspects described below or elsewhere herein.

In an embodiment, the method 800 may include, at 802, receiving, on a feeder link, a preamble reference signal and acquiring channel synchronization (e.g., acquiring a timing of samples and a channel frequency for a stream of symbols). For example, the preamble reference signal may be received in a manner similar to preamble reference signals 602 of FIG. 6. The method 800 may include, at 804, receiving, on the feeder link, a stream of symbols multiplexed in series, e.g., in a manner similar to that at 104 of FIG. 1. The stream of multiplexed symbols may be formed from one or more parallel streams of symbols represented by time-domain samples corresponding to one or more beams. A sample rate of the stream of multiplexed symbols may be greater than a sum of sample rates of the one or more parallel streams of symbols. A duration of symbols of the stream of multiplexed symbols may be shorter than a duration of symbols of the one or more parallel streams of symbols. The method 800 may include, at 806, receiving, between sets of symbols of the stream of multiplexed symbols, one or more reference signals, e.g., in a manner similar to that at 106 of FIG. 1.

In some embodiments, the receiving at 806 may include receiving the one or more reference signals, where a quantity of symbols in the sets of symbols may be equal to a multiple of a quantity of the one or more parallel streams of symbols. In some embodiments, the receiving at 804 may include receiving the stream of multiplexed symbols from another network node, where the other network node includes at least one of: a gateway station, a high altitude platform station, or a satellite.

In some embodiments, the method 800 may include receiving information on a management link. In some embodiments, the receiving of the information may include receiving, on the management link, information that includes at least one of: a quantity of the one or more beams, a sample rate of the stream of multiplexed symbols, a number of samples in a symbol of the stream of multiplexed symbols, a beam index order of the one or more beams, or sample rates of the one or more parallel streams. In some embodiments, the receiving of the information may include receiving, on the management link, information that includes, for configuring the one or more reference signals, at least one of: a type of the one or more reference signals, a timing of the one or more reference signals, or a periodicity of the one or more reference signals.

In some embodiments, the method 800 may further include determining a sample or symbol timing of the stream of multiplexed symbols based on the one or more reference signals, and correcting frequency or phase errors associated with the stream of multiplexed symbols based on the one or more reference signals. In some embodiments, the method 800 may further include demultiplexing the stream of multiplexed symbols into the one or more parallel streams of symbols in an order (e.g., beam index order). In some embodiments, the method 800 may further include processing the time-domain samples for the one or more parallel streams of symbols at the sample rates of the one or more parallel streams of symbols.

As described above, FIG. 8 is provided as an example. Other examples are possible according to some embodiments.

FIG. 9a illustrates an example of an apparatus 10 according to an embodiment. In an embodiment, apparatus 10 may be a node, host, or server in a communications network or serving such a network. For example, apparatus 10 may be a network node, satellite, HAPS, transmitter, receiver, gateway station, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a.

As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-7. For instance, apparatus 10 may be controlled by memory 14 and processor 12 to perform the methods of FIGS. 6 and 7.

FIG. 9b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-5.

In some embodiments, an apparatus (e.g., apparatus 10 and/or apparatus 20) may include means for performing a method or any of the variants discussed herein, e.g., a method described with reference to FIG. 6 or 7. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is possible resolution of problems of OFDM numerology (e.g., SCS) incompatibility between the service link and feeder link, which may allow use of available higher frequency bands by the feeder link to support multiple beams in the LTE and/or NR coverage of HAPS and satellites. Accordingly, the use of some example embodiments results in improved functioning of communications networks and their nodes and, therefore constitute an improvement at least to the technological field of feeder link communications, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single transmitter equally applies to embodiments that include multiple instances of the transmitter, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

ADC Analog to Digital Converter
BBU Baseband Unit
CP Cyclic Prefix
DAC Digital to Analog Converter
DFT Discrete Fourier Transform
DFTS-OFDM DFT-Spread OFDM
DL Downlink
eNB eNodeB (LTE base station)
FDD Frequency Division Duplex
FFT Fast Fourier Transform
FR1 Frequency Range 1
FR2 Frequency Range 2
HAPS High Altitude Platform Station
IFFT Inverse Fast Fourier Transform
gNB gNodeB (NR base station)
IQ In-phase and Quadrature
LEO Low Earth Orbiting
LTE Long Term Evolution
MAC Medium Access Control
NR New Radio
NTN Non-Terrestrial Networks
OFDM Orthogonal Frequency Division Multiplexing
PHY Physical layer
P-to-S Parallel-to-serial converter
SCS Subcarrier Spacing
S-to-P Serial to Parallel converter
TDD Time Division Duplex
UE User Equipment
UL Uplink

We claim:

1. An apparatus, comprising:
at least one processor; and
at least one memory including computer program code,
wherein the at least one memory and the computer program code are configured to, with the at least one processor, cause the apparatus at least to:
transmit, on a feeder link, a stream of symbols multiplexed in series,
wherein the stream of multiplexed symbols is ordered and is formed from one or more parallel streams of symbols represented by time-domain samples corresponding to one or more beams,
wherein a sample rate of the stream of multiplexed symbols is greater than a sum of sample rates of the one or more parallel streams of symbols,
wherein a duration of symbols of the stream of multiplexed symbols is shorter than a duration of symbols of the one or more parallel streams of symbols; and
transmit, between sets of symbols of the stream of multiplexed symbols, one or more reference signals.

2. The apparatus according to claim 1, wherein the apparatus comprises at least one of:
a gateway station,
a high altitude platform station, or
a satellite.

3. The apparatus according to claim 1, wherein the at least one memory and the computer program code are configured to, with the at least one processor, further cause the apparatus, when transmitting the one or more reference signals, at least to:
transmit the one or more reference signals, wherein a quantity of symbols in the sets of symbols is equal to a multiple of a quantity of the one or more parallel streams of symbols.

4. The apparatus according to claim 1, wherein the at least one memory and the computer program code are configured to, with the at least one processor, further cause the apparatus at least to:
multiplex the one or more parallel streams of symbols to form the stream of multiplexed symbols.

5. The apparatus according to claim 4, wherein the at least one memory and the computer program code are configured to, with the at least one processor, further cause the apparatus, when multiplexing the one or more parallel streams of symbols, at least to:
multiplex the one or more parallel streams of symbols in an order of beam indexes of the one or more beams.

6. The apparatus according to claim 1, wherein the at least one memory and the computer program code are configured to, with the at least one processor, further cause the apparatus, when transmitting the stream of multiplexed symbols, at least to:
transmit the stream of multiplexed symbols to another network node, wherein the other network node comprises at least one of:
a gateway station,
a high altitude platform station, or
a satellite.

7. The apparatus according to claim 1, wherein the at least one memory and the computer program code are configured to, with the at least one processor, further cause the apparatus at least to:
transmit information on a management link.

8. The apparatus according to claim 7, wherein the at least one memory and the computer program code are configured to, with the at least one processor, when transmitting the information, at least to:
   transmit, on the management link, the information, wherein the information comprises at least one of:
      a quantity of the one or more beams,
      a sample rate of the stream of multiplexed symbols,
      a number of samples in a symbol of the stream of multiplexed symbols,
      a beam index order of the one or more beams, or
      sample rates of the one or more parallel streams.

9. The apparatus according to claim 7, wherein the at least one memory and the computer program code are configured to, with the at least one processor, when transmitting the information, at least to:
   transmit, on the management link, the information, wherein the information comprises, for configuring the one or more reference signals, at least one of:
      a type of the one or more reference signals,
      a timing of the one or more reference signals, or
      a periodicity of the one or more reference signals.

10. An apparatus, comprising:
   at least one processor; and
   at least one memory including computer program code,
   wherein the at least one memory and the computer program code are configured to, with the at least one processor, cause the apparatus at least to:
   receive, on a feeder link, a stream of symbols multiplexed in series,
      wherein the stream of multiplexed symbols is ordered and formed from one or more parallel streams of symbols represented by time-domain samples corresponding to one or more beams,
      wherein a sample rate of the stream of multiplexed symbols is greater than a sum of sample rates of the one or more parallel streams of symbols,
      wherein a duration of symbols of the stream of multiplexed symbols is shorter than a duration of symbols of the one or more parallel streams of symbols; and
   receive, between sets of symbols of the stream of multiplexed symbols, one or more reference signals.

11. The apparatus according to claim 10, wherein the apparatus comprises at least one of:
   a gateway station,
   a high altitude platform station, or
   a satellite.

12. The apparatus according to claim 10, wherein the at least one memory and the computer program code are configured to, with the at least one processor, further cause the apparatus, when receiving of the one or more reference signals, at least to:
   receive the one or more reference signals, wherein a quantity of symbols in the sets of symbols is equal to a multiple of a quantity of the one or more parallel streams of symbols.

13. The apparatus according to claim 10, wherein the at least one memory and the computer program code are configured to, with the at least one processor, further cause the apparatus, when receiving of the stream of symbols, at least to:
   receive the stream of symbols from another network node, wherein the other network node comprises at least one of:
      a gateway station,
      a high altitude platform station, or
      a satellite.

14. The apparatus according to claim 10, wherein the at least one memory and the computer program code are configured to, with the at least one processor, further cause the apparatus at least to:
   receive information on a management link.

15. The apparatus according to claim 14, wherein the at least one memory and the computer program code are configured to, with the at least one processor, when receiving the information, at least to:
   receive the information on the management link, wherein the information comprises at least one of:
      a quantity of the one or more beams,
      a sample rate of the stream of multiplexed symbols,
      a number of samples in a symbol of the stream of multiplexed symbols,
      a beam index order of the one or more beams, or
      sample rates of the one or more parallel streams.

16. The apparatus according to claim 14, wherein the at least one memory and the computer program code are configured to, with the at least one processor, when receiving the information, at least to:
   receive, on the management link, the information, wherein the information comprises, for configuring the one or more reference signals, at least one of:
      a type of the one or more reference signals,
      a timing of the one or more reference signals, or
      a periodicity of the one or more reference signals.

17. The apparatus according to claim 10, wherein the at least one memory and the computer program code are configured to, with the at least one processor, further cause the apparatus at least to:
   determine a sample or symbol timing of the stream of multiplexed symbols based on the one or more reference signals; and
   correct frequency or phase errors associated with the stream of multiplexed symbols based on the one or more reference signals.

18. The apparatus according to claim 10, wherein the at least one memory and the computer program code are configured to, with the at least one processor, further cause the apparatus at least to:
   demultiplex the stream of multiplexed symbols into the one or more parallel streams of symbols in an order of beam indexes of the one or more beams.

19. The apparatus according to claim 10, wherein the at least one memory and the computer program code are configured to, with the at least one processor, further cause the apparatus at least to:
   process the time-domain samples for the one or more parallel streams of symbols at the sample rates of the one or more parallel streams of symbols.

20. A method, comprising:
   transmitting, on a feeder link by a network node, a stream of symbols multiplexed in series,
      wherein the stream of multiplexed symbols is formed from one or more parallel streams of symbols represented by time-domain samples corresponding to one or more beams,
      wherein a sample rate of the stream of multiplexed symbols is greater than a sum of sample rates of the one or more parallel streams of symbols, wherein a duration of symbols of the stream of multiplexed symbols is shorter than a duration of symbols of the one or more parallel streams of symbols; and transmitting, between sets of symbols of the stream of multiplexed symbols, one or more reference signals.

* * * * *